3,020,886
METHOD AND APPARATUS FOR A CONTROL SYSTEM

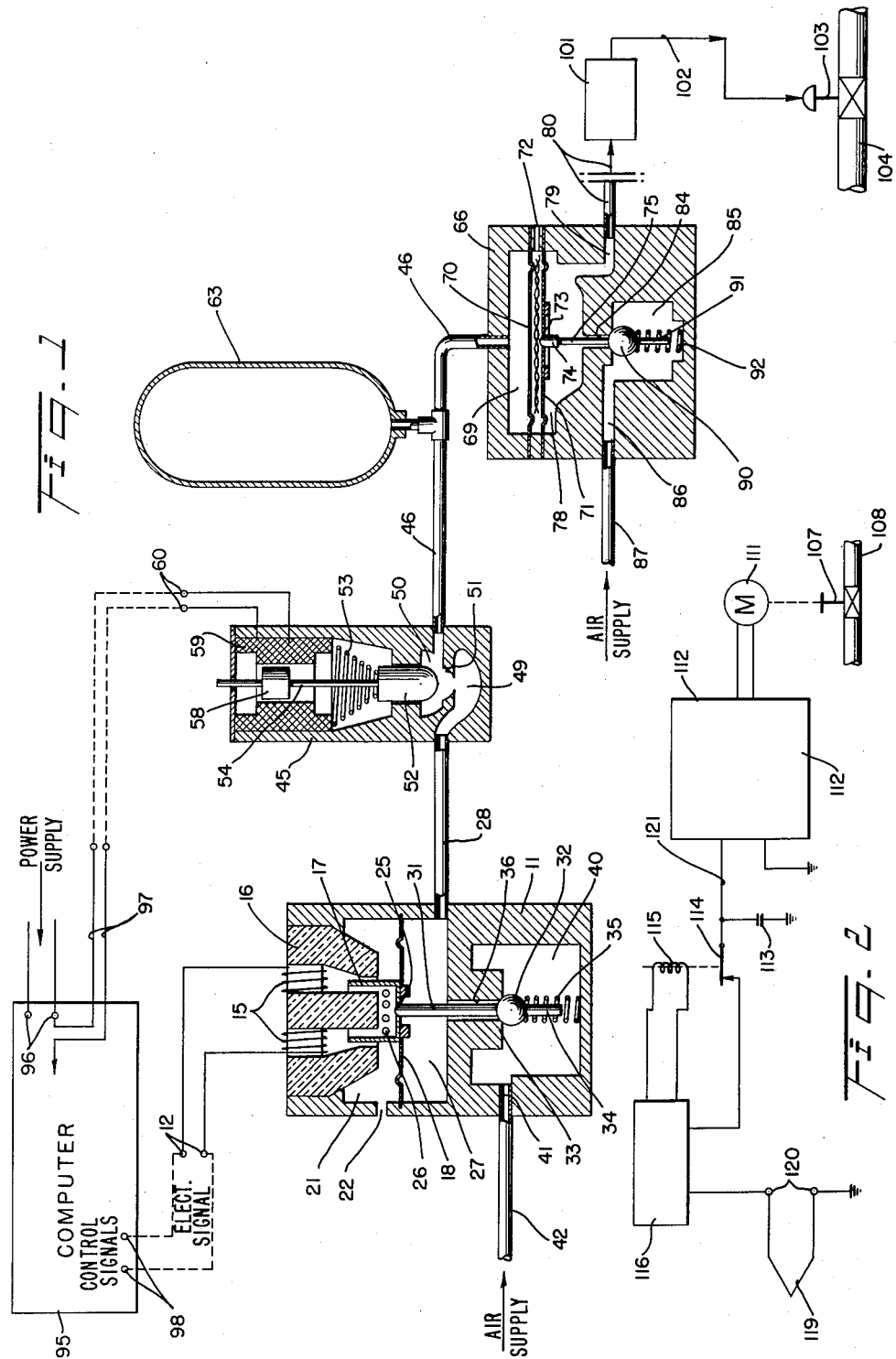

Hershul T. Jones, Port Arthur, Tex., and James M. Jones, Jr., Teaneck, N.J., assignors to Texaco Inc., New York, N.Y., a corporation of Delaware
Filed June 2, 1959, Ser. No. 817,533
10 Claims. (Cl. 121—38)

This invention is broadly concerned with a method that is applicable to control systems in general. More specifically the invention concerns an improvement, whereby, in any control system the controlled condition may be operated upon by means of the path that provides control signals, so as to cut off the source of control signals in the event of failure at such source, while leaving the controlled condition set at the last operating situation that obtained at the time of such failure.

A more specific aspect of the invention is concerned with its application to pneumatic systems. In this connection the invention concerns a combination of elements that are applicable to a pneumatic system to provide improved operation thereof.

There are various systems employed for controlling a condition under the control of control signals, wherein such system is subject to dangerous and/or costly situations developing should the control signals become inoperative, or stop for any reason. In other words there are systems where a simple shut down upon failure of control signals is not feasible. This is especially true where there are a plurality of control points on the system, e.g. in a refinery process.

Consequently it is an object of this invention to teach a method for preventing the possibility of developing such dangerous situations in such controlled systems.

An important application of this invention is to a system for controlling a condition, wherein such a system includes the control of a refinery process by an electric computer. In such control system application, experience has proved that pneumatic control equipment has the required reliability that is imperative in the controlling of a refinery process. The main reason for the reliability of a pneumatic control over a comparable electric control, in such use, is that electric power supply is almost invariably subject to interruption at one time or another of varying duration. With pneumatic control such electric power failure does not render controls inoperative, for reasons that are well known to anyone skilled in the art, e.g. because the pneumatic fluid supply under pressure has considerable volume reserve which will maintain the system operative for considerable periods of time, even if the pressure pumping apparatus that has compressed the pneumatic fluid into the supply tank or reservoir, should be inoperative. However, when an electric computer is applied to control a refinery process, the necessary requirements include the use of electrical output signals to act as control signals for the pneumatic system that is employed in such a refinery process. Therefore, when an electric computer is thus employed, the refinery process becomes subjected to the possibility of uncontrolled, or wild, operations in the event that power supply at the electric computer should fail.

Consequently, it is another object of this invention to provide a system that is applicable to pneumatic control systems generally and particularly to a pneumatic control system employing an electric computer to provide control signals at input points thereof. The combination according to the invention will render the operation such that the pneumatic control system may be held constant at the then existing control situation, whenever a power failure of the electric supply to the computer takes place.

Briefly, the invention may be described as one applicable to a control system having a controlled element, and a controlling device, as well as a signal path for transmitting signals from said device to said element including a reservoir connected to said signal path to receive and float with said signal. In such a control system the invention concerns a method of holding said element at any existing state of control adjustment upon the failure of said signals, which comprises cutting off said signal path between said device and said reservoir to leave the reservoir holding the then existing signal condition and thus maintaining the elements in the then existing positions.

Again briefly, the invention may be described as one applicable to a pneumatic system having signals in the form of pressure variations therein, and employing an electrical transducer for determining said signals. In such a pneumatic system the improvement comprises in combination, reservoir means connected to the pneumatic system for receiving and floating with said signal. It also comprises normally closed valve means being electrically actuated to open position and located between said transducer and said reservoir means in said pneumatic system. The combination also comprises circuit means for connecting said valve means to the source of electrical power for said transducer, whereby electrical failure will cause said valve to close and so cut off said transducer and leave said reservoir means holding the then existing signal pressure on the system.

Another aspect of the invention may be briefly described as that concerned with its use in an electric computer control system wherein pneumatic control coupling is employed between said computer and various control elements. In such a system the improvement comprises means for preventing uncontrolled operation of said control element in the event that there is electric power failure of said computer. Such means including pneumatic reservoir means connected to said control coupling and normally closed valve means in said control coupling. The valve means having electrical means for holding the valve open so long as said computer electrical power is operative.

The foregoing and other objects and benefits of the invention will be made more clear and are set forth in greater detail below, in connection with certain illustrative embodiments that are described hereafter in considerable detail and illustrated in the drawings, in which:

FIG. 1 is a schematic diagram showing a complete electric-computer-controlled pneumatic control system; and, FIG. 2 is a schematic electrical diagram illustrating a control system that is largely electrical as to the components thereof.

Referring to FIG. 1 it will be observed that the application of the invention there illustrated, concerns a pneumatic control system. The particular system illustrated is one having control signals applied in the form of electrical signals, to provide control via the pneumatic system. Consequently, there is a transducer 11 that acts to transform the electrical signals received over an electrical input circuit illustrated, which includes a pair of terminals 12. It will be appreciated that the particular structure of the transducer 11 may take many and various forms, and that there are numerous different types of transducers commercially available. Thus, it will be appreciated that the illustrated transducer 11 is merely a schematic showing of elements that are basic in connection with a transducer of this type, and that the transducer per se forms no part of the invention.

The electric signal path from terminals 12 into the transducer 11, includes a pair of coils 15 that are shown connected in series and that provide the transformation of electric current to magnetic flux, which in turn flows through the magnetic material path indicated, that is in the form of an E-shaped member 16.

For reacting with the magnetic flux that crosses the gaps in the E-shaped member 16, there is an armature 17 that may take any feasible shape. This armature is illustrated as being a cylinder surrounding the center leg of the magnetic material member 16. The armature 17 is supported by and securely attached to the center of a diaphragm 18 that divides the housing of the transducer 11 at this point.

Above the diaphragm 18, when viewed as illustrated in FIG. 1, there is a chamber 21 that may be closed except for a vent or exhaust opening 22 that leads through to the outside of the casing.

At the center of the diaphragm 18, underneath the armature 17, there is a valve seat 25 that is formed in a grommet or other feasible structure as indicated, which in turn is securely attached to the diaphragm 18 for vertical movements therewith as the diaphragm is flexed. The grommet structure with valve seat 25 may be also connected directly to the armature 17 structure, at the base thereof. It will be observed that there are a plurality of passages or holes 26 through the armature 17, in order to provide free flow passage for the pneumatic fluid within transducer 11.

Beneath the diaphragm 18, there is a chamber 27 that has a pneumatic-signal output line, or pipe 28 directly connected to this chamber, as indicated.

The pneumatic pressure within chamber 27 (and consequently pipe 28) is regulated under control of the electrical signals introduced at terminals 12. Such pressure regulation is carried out by means of employing a pair of interconnected inlet and exhaust valves to and from the chamber 27. The exhaust valve is that formed at valve seat 25 in conjunction with a pointed rod 31. This exhaust valve acts to determine the flow of pneumatic fluid from chamber 27 out through the valve and the passages 26 into chamber 21 and then out via the vent opening 22 to the atmosphere. At the same time there is an inlet valve for chamber 27, that is made up of a ball 32 attached to the rod 31 in an integral manner for movement therewith at all times. For coacting with the ball 32, there is a valve seat 33 that is formed on the inside of the body of the transducer 11 and at the lower end of a passage 36 which leads into chamber 27.

On the other side of the ball 32 from the rod 31, there is an extension or guide rod 34 that is surrounded by a compression spring 35 which is in contact with the ball 32 at one end of the spring and the base of the transducer 11 at the other end. This spring 35 urges the ball and rod upward, tending to close the valve that is formed between ball 32 and valve seat 33.

There is a lower chamber 40 that contains the spring 35, guide rod 34 and the valve ball 32 therein. This chamber 40 receives pneumatic fluid under pressure by means of an air inlet passage 41 to which is connected a pipe 42 that carries the supply air under pressure, or whatever other pneumatic fluid may be employed in the pneumatic system.

The operation of an electro-pneumatic transducer is well known to anyone skilled in the art, and such operation may be readily understood in general with reference to the structure that has been illustrated by way of merely a schematic indication of the elements necessary in connection with such a transducer. The operation is briefly as follows. The supply pneumatic fluid, which is introduced via the pipe 42, is thus under a given supply pressure in the chamber 40, e.g. twenty pounds per square inch. The various structural dimensions of the elements of the transducer 11 are such that under balanced conditions the valve 32 is just closed, so as to hold the supply air in chamber 40 and not allow any flow past this valve. At the same time the upper valve 25 (at the pointed tip of rod 31) is also just closed, under balanced conditions. Consequently, whatever pressure exists within the chamber 27 at such time is held constant at some intermediate pressure, e.g. three to fifteen pounds per square inch. Such pressure is of course transmitted as an output pneumatic pressure signal, via the pipe 28. When an electric signal is applied to the terminals 12, the armature 17 is acted upon and causes the diaphragm 18 to be flexed either upward or downward from its neutral or steady state position. Such flecture of diaphragm 18 will either open the valve 32 by pushing down on the rod 31, or it will open the valve 25 by lifting up on the diaphragmh 18. If the former conditions exist then air or pneumatic fluid under pressure in chamber 40 will flow into the chamber 27, and of course be transmitted out as a pressure increase along the pneumatic line 28. But if the latter condition exists then the pressure fluid standing in the chamber 27 will flow out and reduce the pressure therein via the valve 25 and into the chamber 21 that is vented to the atmosphere via passage 22. In either case the change in pressure of pneumatic fluid in the chamber 27 will be caused in conjunction with a new balance of counter forces that are set up with regard to the diaphragm 18, the spring 35 and the electromotive force on armature 17.

It will be understood that the foregoing description of the elements and operation of transducer 11 is merely for purposes of a basic understanding of the operation of such a transducer. Consequently, it will be noted that in many cases a transducer may actually operate with some continuous flow of pneumatic fluid through the transducer. In any event, the transducer operation is such that the output pressure signal tends to be maintained at a predetermined value that directly depends upon the electrical input signal for controlling same.

Following the pneumatic system along the signal path thereof, there is a solenoid actuated valve 45 that is connected to the pnematic pipe 28 on one side thereof, and has another pneumatic line or pipe 46 leading from the other side of the valve. It will be understood that the valve 45 is a conventional element, and may take various forms so long at it is a valve applicable to use with a pneumatic system and has its construction such that it is normally closed by means of any feasible bias arrangement, with the open condition thereof controlled electrically. Thus, to schematically illustrate the basic principles involved with use of such a valve; there is shown the valve 45 which has an inlet valve chamber 49 therein that is directly connected with the pneumatic pipe 28. Also there is an outlet valve chamber 50 that is directly connected to the pneumatic pipe 46. Between the chambers 49 and 50 there is a dividing structure which supports and includes a valve seat 51. The valving action is carried out with a plug 52 that cooperates with valve seat 51. The plug 52 is slideable longitudinally in a fluid-tight manner through the body portion of the valve 45. This movement is biased to its downward, or closed, extreme position by means of a spring 53 that surrounds a guide and supporting shaft 54 for the plug 52. The shaft 54 has attached thereto a magnetic material armature 58 that coacts with magnetic field structure which includes an electrical field producing coil 59. The coil 59 is energized via a pair of wires 61 leading to electrical terminals 60, as illustrated.

It is pointed out that the illustrated schematic showing of valve 45 shows the valve in its open position, such that it has lifted the plug 52 by reason of energization of the coil 59 which pulls the armature 58 up into alignment with the core structure that is part of the mounting for coils 59. The elements will be held in these relative positions so long as the electrical energization is supplied via the terminals 60. Of course, as soon as the required electrical signal is cut off or stopped for any reason, the spring 53 will aid in pushing down on the plug 52 to cause it to seat against the valve seat 51 and thus close the valve 45.

Continuing along the signal path of the pneumatic system, it will be noted that there is an accumulator 63 connected to the pneumatic pipe 46. This accumulator 63 acts as a reservoir for pneumatic fluid. The structure of the accumulator 63 is quite simple, and conventionally takes the form of an elongated cylinder with rounded ends. It will be noted that whatever pneumatic pressure exists in the line within pipe 46, will be transferred to and consequently simultaneously exist within the accumulator 63 which is acting as a reservoir for the pneumatic fluid. Thus, it may be considered that reservoir, or accumulator 63 acts to float on the pneumatic line and vary with the pneumatic pressure signal changes as they occur.

The pneumatic line or pipe 46 also continues beyond the reservoir 63 to be connected to a controlled element, which in this case is illustrated as a pneumatic relay 66.

Here again, the pneumatic relay 66 is relatively schematically indicated. It is a conventional item of pneumatic control equipment. Thus, pneumatic relays may take many different forms and types of construction; but a basic understanding concerning the operation of such a relay may be had by reference to the schematic indication that is made in FIG. 1 in connection with the relay 66. In general a pneumatic relay acts to receive a pneumatic pressure signal on the input thereof and pass on a proportional pneumatic pressure signal at the output thereof; depending upon the construction details to determine what the proportionality may be.

It is to be understood in connection with this invention, that the relay 66 is not the only type of controlled element which might be placed in the system at this point. For example, the element could be (in place of a relay 66) a pneumatic actuator for any control element, such as a valve or the like. The only requirement for proper operation in accordance with the invention, is that the input chamber (or input side) of the controlled element must be substantially pneumatic-fluid tight. The reason for this requirement will be clear upon the complete explanation in connection with the invention, and may already appear to one skilled in the art who appreciates the object that the controlled side of the pneumatic control system should provide for holding the pneumatic pressure signal at whatever condition may exist at the time of a failure of the source of electric control signals.

Returning to the description of pneumatic relay 66, it is pointed out that the elements and operation thereof will become clear upon noting the following. There is an air tight input chamber 69 that has the pneumatic pipe 46 directly connected thereto. There is a diaphragm 70 that is impervious to the pneumatic fluid, and that extends across from one side to the other of the housing structure of the relay 66. Parallel to and connected for movement with diaphragm 70, there is another diaphragm 71. The diaphragm 71 is physically connected with diaphragm 70 by appropriate structure (not shown) so that any flexure of either diaphragm 70 or diaphragm 71 is transferred and acts simultaneously with flexure of the other. There is a vent opening 72 that passes through the casing, or housing of relay 66 to allow free passage of pneumatic fluid from in between the diaphragms 70 and 71 to the atmosphere. At the center of diaphragm 71 there is a circular valve seat structure 73 that provides valving action in conjunction with a pointed tip 74 on a shaft 75. There is a chamber 78 beneath the diaphragm 71. A passageway 79 connects the chamber 78 with an output pneumatic line or pipe 80.

Surrounding the shaft 75, with ample clearance for flow of pneumatic fluid, there is a passage 84 that connects the chamber 78 with a lower chamber 85 wherein air supply is directly provided at the pneumatic supply pressure, via a passage 86 and a pneumatic supply line 87.

Here again, like the transducer 11, the valve structure is quite similar; and there is a valve ball 90 that is securely fastened to, for integral movement with the shaft 75. Also there is a guide extension 91 attached to the ball 90, and there is a spring 92 surrounding the extension 91. The action of the pneumatic relay 66 is quite similar to that of the transducer 11, insofar as the pneumatic valving action to produce output pressure variations is concerned. Therefore the details of such operation need not be explained again; but it is sufficient to point out that the pneumatic pressure supply is introduced over pipe 87 to the chamber 85. Part of the pressure in chamber 85 is transferred by controlled relation with the input pressure signals existing in chamber 69, to the intermediate chamber 78. This transfer of pneumatic pressure, and the setting up of variable pressure signals in chamber 78 (and consequently in connected pipe 80) is controlled by reason of a balance of forces between the input force created in chamber 69 on diaphragm 70 acting against the forces in connection with the spring 92 that acts to tend to close the ball valve 90, as well as the force upward on diaphragm 71 due to the pressure in chamber 78. Such balance of forces determines whether more air is admitted from chamber 85 into chamber 78 (to increase the pressure there) or whether the air in chamber 78 is allowed to flow out into the space between diaphragms 70 and 71, and then via passage 72 to the atmosphere. Thus, whenever a given balance of forces is obtained a given output, or signal pressure is held so as to maintain itself in chamber 78. Of course, such signal pressure is transferred along the pipe 80 that is connected to chamber 78 via passageway 79.

It is contemplated that the basic pneumatic system that has been so far described, which includes a transducer for introduction of electrical control signals, may be employed in various ways and in many different systems. As an illustration of one type of system in which the basic element may be employed, reference may be had to FIG. 1 again, where it will be observed that there is an electric computer 95 that has a power supply input, as indicated, that is connected to input terminals 96.

Within the computer 95 and at a point such that all foreseeable types of power failure occurrence will be in series with the circuit, there is an electrical circuit connection taken out over a pair of wires 97. This circuit is continued for connection, as indicated by the dashed lines, to the terminals 60 for applying the electrical energization to coil 59 of the valve 45. In this manner, whenever the power supply for the computer fails or cuts out for any reason, the valve 45 will be deenergized and will close by reason of its structure which includes the spring 53 to bias same to a closed position.

The computer 95 in such a system, acts as the source of electrical control signals. These signals will be available at a pair of output terminals 98 of the computer, as indicated. Then they will be connected to electrical signal terminals 12 of the transducer 11, as indicated in the illustration by the dashed lines.

It will be observed that in the illustrated arrangement with a computer, the system is connected to act so as to cut off the signal path between transducer 11 and the pneumatic relay 66 whenever the control signals that are electrically applied to the transducer 11 should cut out or fail by reason of a power supply failure to computer 95. This cutting off occurs by reason of the solenoid actuated valve 45, and when the valve 45 is closed the condition of the transducer 11 no longer affects the pressure existing in the signal line 46 that leads to the input of the relay 66. In order to hold this same signal level of pressure in the pipe or pneumatic line 46 in spite of normal leakage which occurs in a pneumatic control system, the accumulator or reservoir 63 is provided. Furthermore the pressure in the reservoir 63 will be at the very pressure level of the signal pressure that existed at the time when the valve 45 was closed. The latter is true because the reservoir 63 remains connected to the pipe 46 and thus acts to receive the signal pressure levels within pipe 46, and float with these pressure levels at all times.

At the output end of the system there is shown an illustrative type of ultimate control equipment. In this case, these ultimately controlled elements include a pneumatic controlled 101, to which the pneumatic line 80 is connected and from which an output pneumatic line 102 leads to a pneumatic valve 103. Valve 103 is in a line 104, for controlling a condition depending upon some characteristic, e.g. pressure or flow, that is controlled by the flow of a fluid through this line 104. Controller 101 is a conventional element and forms no part per se of the invention. Similarly valve 103 is a pneumatically controlled valve that forms no part per se of the invention.

It is pointed out that the valve 103 could be applied in the system to replace the pneumatic relay 66, so long as the valve 103 were of a type having a fluid tight input chamber for receiving the pneumatic control signals.

In the embodiment illustrated in FIG. 1 the need for using a pneumatic relay 66 is necessitated by reason of the construction of most pneumatic controllers (such as would be used at the location of controller 101). This is because most pneumatic controllers have a construction such that they continually have pneumatic flow therethrough and there must be a substantial supply maintained for taking up such pneumatic fluid flow. For this reason it is necessary to isolate such a controller from the electro pneumatic transducer of the system, in order that there may be a substantially pneumatic fluid tight element which receives the pneumatic pressure signals at the output end of the transmission line for such signals. Such fluid tight structure is necessary to avoid the loss of the control signal pressure level (that existed when the control signals were cut off) by reason of the flow of pneumatic fluid which would rapidly cause the pressure to fall from such signal pressure level.

Referring to FIG. 2, it is to be noted that there is illustrated an electrical control system in which the elements required are schematically illustrated. This system is an alternative arrangement for carrying out the method according to this invention. It will be observed that there is a controlled element, which is ultimately a valve 107 that controls flow or pressure conditions in a pipe or flow line 108. The valve 107 is mechanically actuated by an electric motor 111 as indicated by the dashed line. Motor 111 is controlled by any feasible motor control circuit, or arrangement 112. The input circuit of the motor control arrangement 112 has a very high electrical resistance such that the time constant for leaking off of the charge on a capacitor 113 will be relatively long. The capacitor 113 is connected electrically in the circuit, and located between a solenoid actuated switch 114 and the input circuit of the motor control arrangement 112. A solenoid 115 actuates the switch 114 as indicated by the dashed line, and the solenoid is in turn energized from an amplifier 116 schematically shown. The use of amplifier 116 is necessitated by the low power output of the control element that is in this case a thermocouple 119. It will be observed that the thermocouple 119 is connected at the cold junction end thereof, to a pair of output terminals 120.

Now it may be observed that with the illustrated combination of elements shown in FIG. 2 the arrangement is such that, in the event of a break or other type of signal failure from the thermocouple 119, there will be a deenergization of the solenoid 115 so that the switch 114 will fall open. This means that whatever the signal was, that was then existing on the input circuit for the motor control arrangement 112, it will be maintained at that same signal level for a predetermined considerable period of time by reason of the reservoir action of the capacitor 113 that is connected to an input line 121 of the input circuit for motor control arrangement 112. Thus, the capacitor 113 acts as a reservoir for the control signals; and it floats on the input line with the signal changes as they occur there.

Referring to both FIGS. 1 and 2, it will be observed that in its broader aspect the method according to this invention may be carried out with either type of equipment, as shown in these two figures. Thus, it is to be noted that in each case there is illustrated a control system which has a controlled element and a controlling device, as well as a signal path for transmitting signals from such controlling device to the controlled element. Furthermore, this signal path includes a reservoir in each case, that is connected to the signal path so as to receive and float with the signals. It will be clear to anyone skilled in the art that the reservoir is the accumulator 63 in the FIG. 1 pneumatic system, or it is the capacitor 113 in the FIG. 2 electrical system. Now, the method that is carried out is one of holding the controlled element at any existing state of control adjustment upon the failure of the signals at the controlling device end of the system, and it includes the step of cutting off the signal path between the said controlling device and the reservoir so as to leave the reservoir holding the then existing signal condition, and consequently maintaining the controlled element in its then existing position.

With reference to FIG. 1 it is to be noted that the basic elements of a system according to the invention may be applied to various and different pneumatic control systems, and the illustrated embodiment concerning the use of a computer is merely one manner of making use of the invention. However, this is a very important use for this invention in that when an electric computer is employed to, in effect, close the loop of control on a chemical process or a refinery process; the process thus controlled must be able to be maintained within certain safe limits as to the controlling action at the various controlled points thereof. Consequently for purposes of safe operation, it is important to avoid the possible loss of control that would be affected in case the electrical power supply should fail. During such electric power supply failure, the computer output electrical signal would most certainly not represent the desired control situation and consequently might rapidly lead to a change or changes in the control conditions on the system such that the process might run away and result in dangerous and/or costly failure, in connection with the process that is under control. The magnitude of the possibility in connection with such failure may be readily realized by anyone familiar with the dangers and costs involved in many present day refinery processes. By making use of this invention, however, such costly and dangerous failures can be entirely avoided.

While certain embodiments in connection with the invention have been set forth above in considerable detail in accordance with the applicable statutes, this is not to be taken as in any way limiting the invention but merely as being descriptive thereof.

What is claimed as the invention is:

1. In a pneumatic system having signals in the form of pressure variations therein and employing an electrical transducer for determining said signals, the improvement comprising in combination pneumatic reservoir means connected to the pneumatic system for receiving and floating with said signals, normally closed pneumatic valve means being electrically actuated to open position and located between said transducer and said reservoir means in said pneumatic system, and electrical circuit means connecting said valve means to the source of electrical power for said transducer whereby electrical failure will cause said valve to close and so cut off said transducer and leave said reservoir means holding the then existing signal pressure on the system.

2. In a pneumatic system having signals in the form of pressure variations therein and employing an electrical transducer for determining said signals, the improvement comprising in combination pneumatic reservoir means connected to the pneumatic system for receiving and floating with said signals, normally closed pneumatic valve means being electrically actuated to open position and located between said transducer and said reservoir means in said pneumatic system, electrical circuit means for connecting said pneumatic valve means to the source of electrical power for said transducer, pneumatic means for receiving said signals and utilizing same, said last named means being located in said pneumatic system on the same side of said pneumatic valve means as said reservoir means and being substantially fluid tight looking toward said reservoir, said electrical circuit means acting such that electrical failure will release and cause said valve to close and so cut off said transducer and leave said reservoir means holding the then existing signal pressure on the system.

3. In a pneumatic system having signals in the form of pressure variations therein and employing an electrical transducer for determining said signals, the improvement comprising in combination pneumatic reservoir means connected to the pneumatic system for receiving and floating with said signals, normally closed pneumatic valve means being electrically actuated to open position and located between said transducer and said reservoir means in said pneumatic system, electrical circuit means for connecting the electrically actuated part of said pneumatic valve means to the source of electrical power for said transducer, a pneumatic relay having a fluid tight input section connected to receive said signals and an output section for providing second signals proportional to said first named signals, and controlled means connected to receive said second signals, said pneumatic valve means acting upon failure of the electric power source to cut off said transducer leaving said reservoir means holding the then signal pressure steady.

4. In an electric-computer-controlled system wherein pneumatic control coupling is employed between said computer and various control elements, the improvement comprising means for preventing uncontrolled operation of said control elements in the event that there is electric power failure of said computer, including pneumatic reservoir means connected pneumatically to said control coupling, and normally closed pneumatic valve means in said control coupling and having electrical means for holding the valve open so long as said computer electrical power is operative.

5. In an electric-computer-controlled system wherein pneumatic control coupling is employed between said computer and various control elements, said control coupling including a transducer and a pneumatic controlled element, the improvement comprising means for preventing uncontrolled operation of said control elements in the event that there is electric power failure of said computer, including pneumatic reservoir means pneumatically connected to said control coupling, normally closed pneumatic valve means connected into said control coupling between said reservoir means and said transducer, and electrical means for holding said pneumatic valve means open so long as there is no power failure of said computer.

6. In an electro-pneumatic system in combination means for controlling a variable, pneumatic means for actuating said controlling means, electric means for providing electrical control signals, a pneumatic control connection between said pneumatic means and said electric means including a transducer for converting said electrical control signals to pneumatic control signals, a pneumatic reservoir connected pneumatically to said control connection, and a normally closed pneumatic valve in said control connection located between said transducer and said reservoir.

7. In an electro-pneumatic system in combination, means for controlling a variable, pneumatic means for actuating said controlling means including a fluid tight input chamber, first electric means for providing electrical control signals, a pneumatic control connection between said pneumatic means and said electric means including a transducer for converting said electrical control signals to pneumatic control signals, a pneumatic reservoir pneumatically connected to said control connection, a normally closed pneumatic valve in said control connection and located between said transducer and said reservoir, and second electric means for actuating said pneumatic valve to the open position so long as the electric power is being supplied to provide said electrical control signals.

8. In an electro-pneumatic system in combination, means for controlling a variable, pneumatic means for actuating said controlling means including a fluid tight input chamber, an electrical computer for providing electrical control signals, a pneumatic control connection between said pneumatic means and said computer including a transducer for converting said electrical control signals to pneumatic control signals, a pneumatic reservoir connected to said control connection, a normally closed pneumatic valve in said control connection located pneumatically between said transducer and said reservoir, and electric means for actuating said pneumatic valve to the open position so long as the electric power is being supplied to provide said electrical control signals.

9. In an electro-pneumatic system in combination, means for controlling a variable, pneumatic means for actuating said controlling means including a pneumatic relay having a fluid tight input chamber therein, an electrical computer for providing electrical control signals, a pneumatic fluid line connected to said fluid tight chamber at one end of said line, a transducer connected pneumatically to the other end of said fluid line and electrically to receive said electrical control signals, an accumulator connected to said fluid line along the length thereof, a valve in said fluid line between said accumulator and said transducer, said valve being mechanically biased to the closed position, and electric means for actuating said valve to the open position so long as the electric power is being supplied to provide said electrical control signals.

10. A control system for maintaining continuous control of a process variable, comprising in combination valve means for controlling said process variable, pneumatic means for actuating said valve means, an electrical computer for providing electrical control signals for determining the control of said valve means, a pneumatic relay having a fluid tight input chamber, a pneumatic fluid line connected at one end to said fluid tight chamber, a transducer connected pneumatically to the other end of said fluid line and connected electrically to said computer to receive said electrical control signals, said transducer providing pneumatic signals in accordance with said electric signals, a pneumatic accumulator connected to said fluid line, a pneumatic valve in said fluid line pneumatically between said accumulator and said transducer, said pneumatic valve being mechanically biased to closed position, and electric means for actuating said pneumatic valve to open position so long as the electric power is being supplied to provide said electrical control signals.

References Cited in the file of this patent
UNITED STATES PATENTS

| | | |
|---|---|---|
| 2,692,581 | Ziebolz | Oct. 26, 1954 |
| 2,879,781 | Gimson | Mar. 31, 1959 |